(12) United States Patent
Fujiwara et al.

(10) Patent No.: US 7,729,837 B2
(45) Date of Patent: Jun. 1, 2010

(54) CONTROL APPARATUS AND METHOD FOR CONTINUOUSLY VARIABLE TRANSMISSION

(75) Inventors: Hiroya Fujiwara, Toyota (JP); Akira Hino, Toyota (JP); Shinya Toyoda, Nissin (JP); Tadashi Tamura, Nishikamo-gun (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 225 days.

(21) Appl. No.: 12/101,217

(22) Filed: Apr. 11, 2008

(65) Prior Publication Data

US 2008/0255737 A1    Oct. 16, 2008

(30) Foreign Application Priority Data

Apr. 12, 2007    (JP) .............................. 2007-104742

(51) Int. Cl.
*F16H 61/02* (2006.01)
*G06F 19/00* (2006.01)

(52) U.S. Cl. ............................. 701/51; 701/55; 701/61; 477/37; 477/98

(58) Field of Classification Search .................. 701/51, 701/55, 56, 61, 62, 54, 67; 477/37, 34, 39, 477/76, 98, 91, 132, 64, 80; 474/8
See application file for complete search history.

(56) References Cited

U.S. PATENT DOCUMENTS

| 2001/0049574 | A1* | 12/2001 | Taniguchi et al. ............. 701/51 |
| 2006/0276279 | A1* | 12/2006 | Suzuki .......................... 474/8 |

FOREIGN PATENT DOCUMENTS

| JP | 02271152 | A | 11/1990 |
| JP | 8-338520 | A | 12/1996 |
| JP | 10-122342 | A | 5/1998 |
| JP | 11-37276 | A | 2/1999 |
| JP | 2004-100905 | A | 4/2004 |
| JP | 2004-162799 | A | 6/2004 |

* cited by examiner

*Primary Examiner*—Tan Q. Nguyen
(74) *Attorney, Agent, or Firm*—Sughrue Mion, PLLC

(57) ABSTRACT

When the vehicle is traveling on an uphill road (step 100: YES), the ECU executes a program in which, if the speed of the vehicle is equal to or higher than Vblt (step 102: NO) and a speed ratio γ(1) required to secure a sufficient climbing capacity of the vehicle is equal to or lower than a speed ratio γ(2) required to secure a sufficient returnability of the belt of the continuously variable transmission (step 106: NO), a belt returnability securing control is executed (step 110), and otherwise (step 102: YES or step 106: YES), a climbing control is executed (step 104 or step 108).

12 Claims, 7 Drawing Sheets

CONTROL APPARATUS AND METHOD FOR CONTINUOUSLY VARIABLE TRANSMISSION

INCORPORATION BY REFERENCE

The disclosure of Japanese Patent Application No. 2007-104742 filed on Apr. 12, 2007 including the specification, drawings and abstract is incorporated herein by reference in its entirety.

BACKGROUND OF THE INVENTION

1. Field of the Invention

The invention relates to control of a continuously variable transmission, and particularly to a technology that enables, when the vehicle is traveling on an uphill road, appropriate switching of the shift control mode between a mode for securing a sufficient climbing performance of the vehicle and a mode for ensuring that the belt of the continuously variable transmission can be returned to the position corresponding to the initial speed ratio for starting the vehicle from a standstill before the vehicle comes to a stop.

2. Description of the Related Art

Belt-type CVTs (Continuously Variable Transmissions) have been used as vehicle transmissions. A belt-type CVT is constituted of a drive pulley (primary pulley) and a driven pulley (secondary pulley) each having a belt groove having a V-shaped cross section and a belt wound around the drive pulley and the driven pulley. In operation, the width of the groove of one pulley is increased while the width of the groove of the other pulley is reduced, whereby the diameter of the belt loop at each pulley (pitch diameter) continuously changes. This is how the speed ratio of the belt-type CVT changes continuously.

In a vehicle incorporating such a belt-type CVT, the width of the groove of the drive pulley and the width of the groove of the driven pulley are changed using hydraulic actuators so as to achieve a target speed ratio set in accordance with the vehicle speed and the accelerator operation amount.

A technology is known which corrects the target speed ratio of a belt-type CVT based on the running resistance against the vehicle. For example, Japanese Patent Application Publication 2004-162799 (JP-A-2004-162799) describes a CVT shift control apparatus that enables accelerating the vehicle just as intended by the driver upon kick-down acceleration regardless of variation of the running resistance (e.g., road gradient). This CVT shift control apparatus includes operation state detecting means for detecting the operation state of the vehicle including the vehicle speed and the accelerator operation amount, speed ratio setting means for setting the target speed ratio in accordance with the vehicle speed and the accelerator operation amount, and controlling means for controlling the speed ratio of the CVT based on the set speed ratio. Further, the CVT shift control apparatus includes acceleration requirement determining means for determining the degree of acceleration requirement, acceleration shift characteristic setting means for setting the downshift characteristic and the upshift characteristic based on the degree of acceleration requirement, respectively, acceleration controlling means for, when the degree of acceleration requirement is higher than a predetermined reference value, shifting the CVT down to a target speed ratio that is lower than the target speed ratio set by the speed ratio setting means based on the downshift characteristic and then shifting the CVT up based on the upshift characteristic; running resistance detecting means for detecting the running resistance against the vehicle; and speed ratio correcting means for, when the running resistance is larger than a predetermined value, correcting the target speed ratio for downshift based on the magnitude of the running resistance.

Japanese Patent Application Publication No. 2004-162799 describes a shift control apparatus that brings the rising and dropping of the acceleration of the vehicle into balance by suppressing an excessive increase in the engine speed and a decrease in the acceleration of the vehicle when accelerating the vehicle, so that the vehicle can be reliably accelerated just as intended by the driver. This shift control apparatus corrects the target speed ratio for downshift according to the magnitude of the running resistance when the running resistance is higher than a certain value. According to this shift control apparatus, therefore, the driver can always feel the vehicle being accelerated just as he or she intends even if the running resistance (e.g., road gradient) changes, and therefore the drivability of the vehicle improves significantly.

Meanwhile, when a vehicle is braked and stopped on an uphill road, the stopping distance (stopping duration) of the vehicle tends to be relatively short, and in such a case, therefore, the belt of the CVT may fail to return to the position corresponding to the initial speed ratio for starting the vehicle from a standstill before the vehicle comes to a stop. If the belt is not at the initial speed ratio position when starting the vehicle from a standstill, the acceleration performance of the vehicle deteriorates. Note that the capability to return the belt to the initial speed ratio position when the vehicle is being stopped will hereinafter be referred to as "the returnability of the belt" or the like.

In view of the above, it is necessary to switch the shift control mode between a mode for achieving a climbing performance required by the driver, which is determined from the vehicle speed and the accelerator operation amount, and a mode for achieving a sufficient returnability of the belt at the time of stopping the vehicle.

However, the shift control apparatus described in JP-A-2004-162799 does not take into consideration the returnability of the belt at the time of stopping the vehicle, and therefore the above issue can not be solved.

SUMMARY OF THE INVENTION

The invention provides continuously variable transmission control apparatus and method that enable, when the vehicle is traveling on an uphill road, appropriate switching of the shift control mode between the mode for securing a sufficient climbing performance of the vehicle and the mode for securing a sufficient returnability of the belt of the continuously variable transmission.

The first aspect of the invention relates to a control apparatus for a continuously variable transmission of a vehicle, the continuously variable transmission having a drive pulley the width of a groove of which is varied using an actuator, a driven pulley the width of a groove of which is varied using an actuator, and a belt wound around the drive pulley and the driven pulley, the diameter of the belt loop at the drive pulley and the diameter of the belt loop at the driven pulley being variable to change the speed ratio of the continuously variable transmission. This control apparatus has: determining means for determining the degree of influence on the returnability of the belt of the continuously variable transmission based on a state of the vehicle; and controlling means for, when the vehicle is traveling on an uphill road, executing a first shift control mode for securing a sufficient climbing performance of the vehicle if the degree of influence on the returnability of the belt is low and executing a second shift control mode for securing a sufficient returnability of the belt if the influence on the returnability of the belt is high.

According to the control apparatus described above, the determining means determines whether the degree of influence on the returnability of the belt is high based on the state of the vehicle (e.g., the vehicle speed). If said influence is high, the second shift control mode for securing a sufficient returnability of the belt is executed, and therefore the belt can be returned to the position corresponding to the initial speed ratio for starting the vehicle from a standstill, thereby preventing deterioration of the acceleration performance of the vehicle which may otherwise occur when the vehicle is started from a standstill next time. On the other hand, if the degree of influence on the returnability of the belt is low, the first shift control mode for securing a sufficient climbing performance of the vehicle is executed, so that drive force required based on the vehicle speed and the running resistance is obtained. As such, the above-described control apparatus enables appropriate switching of the shift control mode between the mode for securing a sufficient climbing performance of the vehicle and the mode for securing a sufficient returnability of the belt of the continuously variable transmission.

The above-described control apparatus may further include speed detecting means for detecting the speed of the vehicle. The determining means may determine that the degree of influence on the returnability of the belt is high when the detected speed of the vehicle is equal to or lower than a reference vehicle speed that is set in accordance with the gradient of the uphill road and a first target speed ratio that is set in accordance with the state of the vehicle in the first shift control mode is equal to or lower than a second target speed ratio that is set in accordance with the state of the vehicle in the second shift control mode. While the determination as to the degree of influence on the returnability of the belt is performed by detecting the vehicle speed and then comparing it with the reference vehicle speed in this example, it may be performed otherwise. For example, the determination may be performed by detecting a physical quantity related to the vehicle speed and then comparing it with a reference physical quantity that is set based on the gradient of the uphill road.

According to the structure described above, the determining means determines that the degree of influence on the returnability of the belt is high when the vehicle speed is equal to or lower than the reference vehicle speed and the first target speed ratio is equal to or lower than the second target speed ratio. As such, when the vehicle is being stopped, the belt of the continuously variable transmission can be returned to the position corresponding to the initial speed ratio for starting the vehicle from a standstill, thereby preventing deterioration of the acceleration performance of the vehicle which may otherwise occur when starting the vehicle from a standstill next time.

The above-described control apparatus may be such that the determining means determines that the degree of influence on the returnability of the belt is low if the detected speed of the vehicle is higher than the reference vehicle speed or if the first target speed ratio is higher than the second target speed ratio.

According to the structure described above, the determining means determines that the degree of influence on the returnability of the belt is low if the detected speed of the vehicle is higher than the reference vehicle speed or if the first target speed ratio is higher than the second target speed ratio. In this case, the first shift control mode is executed, so that the speed ratio of the continuously variable transmission is controlled to the first target speed ratio and thus drive force required based on the vehicle speed and the running resistance is obtained. Further, because the first target speed ratio is higher (more speed-reducing) than the second target speed ratio, executing the first shift control mode enhances the returnability of the belt.

The above-described control apparatus may further have response detecting means for detecting a physical quantity related to the operation response of the continuously variable transmission, and the control apparatus may correct the reference vehicle speed, the first target speed ratio, and the second target speed ratio in accordance with the detected physical quantity related to the operation response of the continuously variable transmission.

The lower the operation response of the continuously variable transmission, the higher the degree of influence on the returnability of the belt tends to be. According to the structure described above, however, because the reference vehicle speed, the first target speed ratio, and the second target speed ratio are corrected based on the physical quantity related to the operation response of the continuously variable transmission (e.g., the temperature of the hydraulic fluid circulated in the continuously variable transmission), said response can be taken into consideration in switching the shift control mode between the mode for securing a sufficient returnability of the belt and the mode for securing a sufficient climbing performance of the vehicle.

The physical quantity related to the operation response of the continuously variable transmission may be the temperature of hydraulic fluid circulated in the continuously variable transmission.

The lower the temperature of the hydraulic fluid, the higher the viscosity of the hydraulic fluid and thus the lower the operation response of the continuously variable transmission. Conversely, the higher the temperature of the hydraulic fluid, the lower the viscosity of the hydraulic fluid and thus the higher the operation response of the continuously variable transmission. When the operation response of the continuously variable transmission is low, the degree of influence on the returnability of the belt tends to be relatively large. Therefore, by correcting the reference vehicle speed, the first target speed ratio, and the second target speed ratio in accordance with the temperature of the hydraulic fluid, the operation response of the continuously variable transmission can be taken into consideration in switching the shift control mode between the mode for securing a sufficient returnability of the belt and the mode for securing a sufficient climbing performance of the vehicle.

The above-described control apparatus may further have gradient detecting means for detecting a physical quantity related to the gradient of a road on which the vehicle is traveling and the control apparatus may correct the reference vehicle speed, the first target speed ratio, and the second target speed ratio in accordance with the physical quantity related to the gradient of the road.

The larger the gradient of the road, the shorter the stopping distance of the vehicle when it is stopped, and therefore the degree of influence on the returnability of the belt increases accordingly. Therefore, by correcting the reference vehicle speed, the first target speed ratio, and the second target speed ratio in accordance with the gradient of the road, the running state of the vehicle can be taken into consideration in switching the shift control mode between the mode for securing a sufficient returnability of the belt and the mode for securing a sufficient climbing performance of the vehicle.

The above-described control apparatus may further have requirement degree detecting means for detecting the degree of requirement for producing drive force for the vehicle and rotation speed detecting means for detecting the rotation speed of the drive pulley, and the determining means may have speed ratio determining means for setting the first target speed ratio and the second target speed ratio based on the detected requirement degree, the detected rotation speed of the drive pulley, and the detected speed of the vehicle.

According to the structure described above, the first target speed ratio and the second target speed ratio are set based on the degree of requirement for producing drive force for the vehicle (e.g., the operation amount of the accelerator pedal), the rotation speed of the drive pulley, the vehicle speed, and a predetermined relation between the rotation speed of the drive pulley and the vehicle speed. For example, if the relation between the rotation speed for securing a sufficient returnability of the belt and the vehicle speed and the relation between the rotation speed for securing a sufficient climbing performance of the vehicle and the vehicle speed have been set in advance, the first target speed ratio and the second target speed ratio can be set based on the detected degree of requirement for producing drive force for the vehicle, the detected rotation speed of the drive pulley, and the detected vehicle speed.

The above-described control apparatus may be such that the speed ratio determining means sets the higher of the first target speed ratio and the second target speed ratio to an actual target speed ratio of the continuously variable transmission and the controlling means may control the speed ratio of the continuously variable transmission to the actual target speed ratio.

According to the structure described above, even if the vehicle speed is lower than the reference vehicle speed, the higher of the first speed ratio and the second speed ratio is set to the actual target speed ratio of the continuously variable transmission. Therefore, at least the returnability of the belt can be improved regardless of whether the first shift control mode or the second shift control mode is executed. As such, it is possible to prevent deterioration of the acceleration performance of the vehicle which may otherwise occur when the vehicle is started from a standstill next time.

The above-described control apparatus may be such that the control apparatus controls the speed ratio of the continuously variable transmission such that, when the actual target speed ratio of the continuously variable transmission is being switched from one of the first target speed ratio and the second target speed ratio to the other, the rate of change in the speed ratio of the continuously variable transmission does not exceed a rate that is set in accordance with the gradient of the uphill road.

According to the structure described above, when the actual target speed ratio of the continuously variable transmission is being switched from one of the first target speed ratio and the second target speed ratio to the other, the rate of change in the speed ratio of the continuously variable transmission is limited below a rate corresponding to the gradient of the uphill road. Thus, the driver does not feel uncomfortable.

The second aspect of the invention relates to a method for controlling a continuously variable transmission of a vehicle, the continuously variable transmission having a drive pulley the width of a groove of which is varied using an actuator, a driven pulley the width of a groove of which is varied using an actuator, and a belt wound around the drive pulley and the driven pulley, the diameter of the belt loop at the drive pulley and the diameter of the belt loop at the driven pulley being variable to change the speed ratio of the continuously variable transmission. This method includes: determining the degree of influence on the returnability of the belt of the continuously variable transmission based on a state of the vehicle; and when the vehicle is traveling on an uphill road, executing a first shift control mode for securing a sufficient climbing performance of the vehicle if the degree of influence on the returnability of the belt is low and executing a second shift control mode for securing a sufficient returnability of the belt if the influence on the returnability of the belt is high.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

Figure 1:
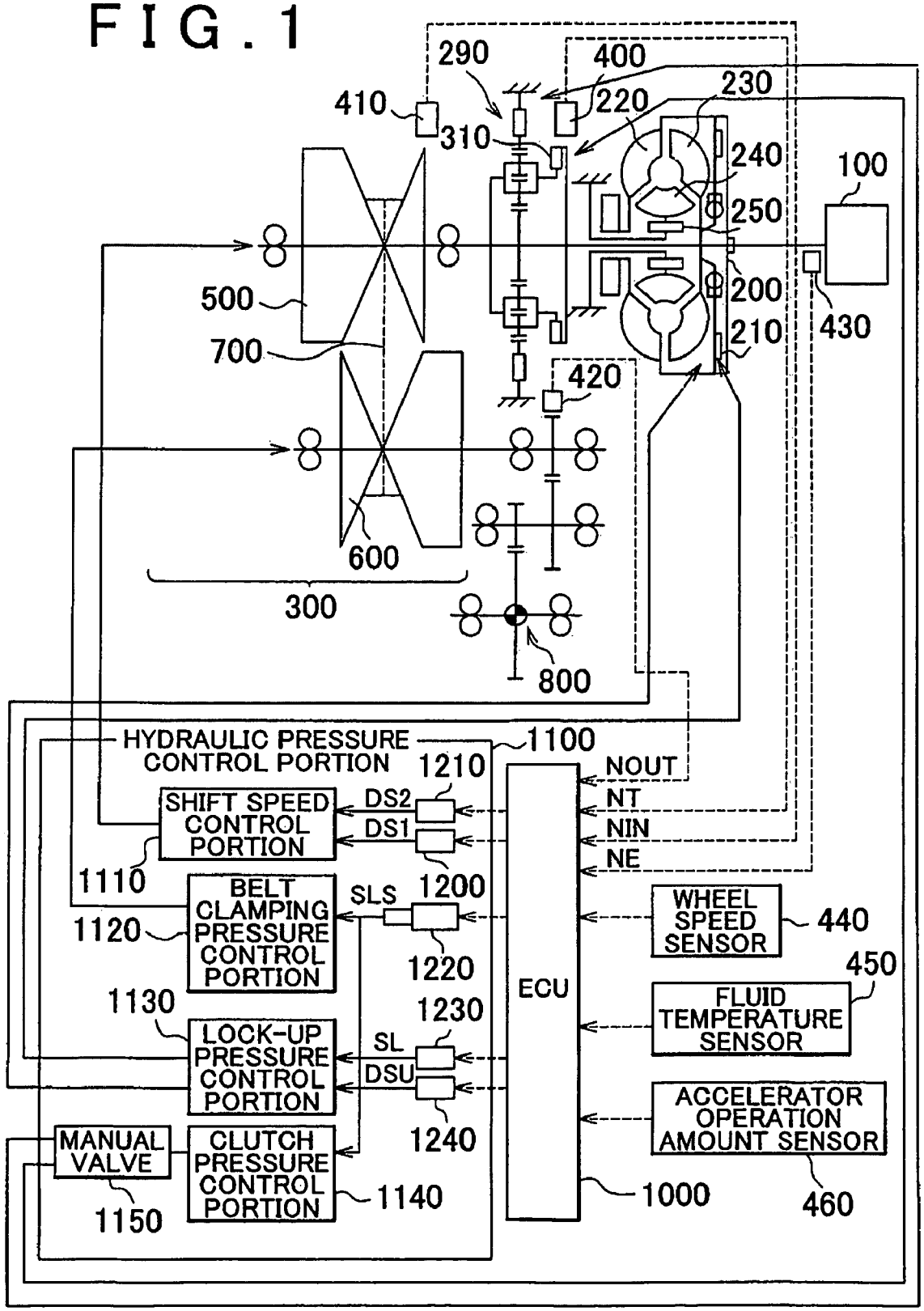
FIG. 1 is a view showing the configuration of a continuously variable transmission controlled by a CVT control apparatus according to an example embodiment of the invention.

Hereinafter, example embodiments of the invention will be described with reference to the drawings. In the following descriptions, like elements and components are denoted by line reference numerals, and because the names and functions of such like elements and components are the same as each other, their detailed descriptions are not repeated.

First, the configuration of the power train of a vehicle incorporating a CVT control apparatus according to an example embodiment of the invention will be described with reference to FIG. 1. The CVT control apparatus of this example embodiment is constituted of an ECU (Electronic Control Unit) 1000 shown in FIG. 1, and the CVT is a belt-type CVT.

Referring to FIG. 1, the power train of the vehicle is constituted of an engine 100, a torque converter 200, a forward-reverse switching device 290, a belt-type CVT mechanism 300, a differential 800, the ECU 1000, and a hydraulic pressure control portion 1100. Among these, the torque converter 200, the forward-reverse switching device 290, the CVT mechanism 300, and the hydraulic pressure control portion 1100 together constitute the CVT.

The output shaft of the engine 100 is connected to the input shaft of the torque converter 200. The engine 100 and the torque converter 200 are coupled with each other via a rotational shaft. Thus, an output shaft speed NE (engine speed NE) of the engine 100, which is detected by an engine speed sensor 430, is always equal to an input shaft rotation speed (pump rotation speed) of the torque converter 200.

The torque converter 200 is constituted of a lock-up clutch 210 operable to directly connect the input shaft and the output shaft of the torque converter 200, a pump impeller 220 provided on the input shaft side, a turbine impeller 230 provided on the output shaft side, and a stator having an one-way clutch 250 and providing a torque amplification effect. The torque converter 200 and the CVT mechanism 300 are connected to each other via a rotational shaft. An output shaft rotation speed NT (turbine speed NT) of the torque converter 200 is detected by a turbine speed sensor 400.

The CVT mechanism 300 is connected to the torque converter 200 via the forward-reverse switching device 290. The CVT mechanism 300 is constituted of an primary pulley 500 on the input side, a secondary pulley 600 on the output side, and a metal belt 700 wound around the primary pulley 500 and the secondary pulley 600. The primary pulley 500 is constituted of a stationary sheave fixed on a primary shaft and a movable sheave supported on the primary shaft such that it can slide thereon. The secondary pulley 600 is constituted of a stationary sheave fixed on a secondary shaft and a movable sheave supported on the secondary shaft such that it can slide thereon. In the CVT mechanism 300, a primary pulley rotation speed sensor 410 is provided to detect a rotation speed Nin of the primary pulley 500 and a secondary pulley rotation speed sensor 420 is provided to detect a rotation speed Nout of the secondary pulley 600.

The primary pulley rotation speed sensor 410 is arranged so as to face the rotational shaft of the primary pulley 500 or face the gear teeth of a rotation-detection gear provided on a drive shaft connected to the rotational shaft of the primary pulley 500, and the secondary pulley rotation speed sensor 420 is arranged so as to face the rotational shaft of the secondary pulley 600 or face the gear teeth of a rotation-detection gear provided on a drive shaft connected to the rotational shaft of the secondary pulley 600. The primary pulley rotation speed sensor 410 is capable of detecting even slight rotation of the primary pulley 500, which serves as the input shaft of the CVT mechanism 300, and the secondary pulley rotation speed sensor 420 is capable of detecting even slight rotation of the secondary pulley 600, which serves as the output shaft of the CVT mechanism 300. For example, magnetic-resistance element sensors, which are often referred to as "semiconductor sensors", may be used as the rotation speed sensors 410 and 420.

The forward-reverse switching device 290 is constituted of a double-pinion type planetary gearset, a reverse brake B1 (reverse-drive brake), and an input clutch C1. The sun gear of the planetary gearset is coupled with the input shaft of the forward-reverse switching device 290, and the carrier CR supporting the first and second pinions P1 and P2 is coupled with the stationary sheave of the primary pulley 500, and the ring gear R is coupled with the reverse brake B1 serving as a frictional coupling for reverse drive, and an input clutch C1 is provided between the carrier CR and the ring gear R. This input clutch 310 is also called "forward-drive clutch" or "forward clutch" and it is applied whenever the vehicle is traveling forward, that is, except when the shift position is at the parking position (P), the reverse position (R), and the neutral position (N).

Next, the ECU 1000 and the hydraulic pressure control portion 1100 used to control this power train will be described. The ECU 1000 receives the signals output from the turbine speed sensor 400 that detects the turbine speed NT, the signals output from the primary pulley rotation speed sensor 410 that detects the primary pulley rotation speed Nin, and the signals output from the secondary pulley rotation speed sensor 420 that detects the secondary pulley rotation speed Nout, respectively.

The hydraulic pressure control portion 1100 incorporates a shift speed control portion 1110, a belt-clamping force control portion 1120, a lock-up pressure control portion 1130, a clutch pressure control portion 1140, and a manual valve 1150. The ECU 1000 outputs various control signals to a shift control duty solenoid (1) 1200, a shift control duty solenoid (2) 1210, a belt-clamping force control linear solenoid 1220, a lock-up solenoid 1230, and a lock-up pressure control duty solenoid 1240 in the hydraulic pressure control portion 1100. Because the hydraulic pressure control portion 1100 incorporates a known hydraulic circuit configuration, its detail is not described in this specification.

Further, the ECU 1000 receives the signals output from an accelerator operation amount sensor 460 that detects the amount the accelerator pedal is being stepped down by the driver, the signals output from a throttle position sensor (not shown in the drawings) that detects the degree of opening of an electromagnetic throttle, and the signals output from the engine speed sensor 430 that detects the engine speed (NE) of the engine 100.

In the hydraulic pressure control portion 1100, the belt-clamping force control portion 1120 controls the clamping pressure of the belt 700 of the CVT mechanism 300 based on the control signals output from the ECU 1000 to the belt-clamping pressure control linear solenoid 1220. The clamping pressure of the belt 700 is the contact pressure between each pulley and the belt 700.

A wheel speed sensor 440 detects the rotation speed of the drive wheels of the vehicle (not shown in the drawings). The wheel speed sensor 440 outputs wheel speed signals indicating the detected rotation speed of the drive wheels to the ECU 1000. Note that, in this example embodiment, the vehicle speed may be determined in various ways other than by detecting the rotation speed of the drive wheels. That is, there are various physical quantifies related to the vehicle speed. For example, the rotation speed of the driven wheels of the vehicle may be calculated based on the rotation speed of the secondary pulley 600 and the speed reduction ratio established between the CVT and the driven wheels of the vehicle.

A fluid temperature sensor 450 detects the temperature of hydraulic fluid circulated in the CVT. The fluid temperature sensor 450 outputs fluid temperature signals indicating the detected temperature of the hydraulic fluid to the ECU 1000. Note that, in this example embodiment, the shift response of the CVT may be determined in various ways other than by detecting the temperature of the hydraulic fluid. That is, there are various other physical quantities related to the shift response of the CVT, and any of such physical quantities may be obtained and used instead of the temperature of the hydraulic fluid.

Figure 2:
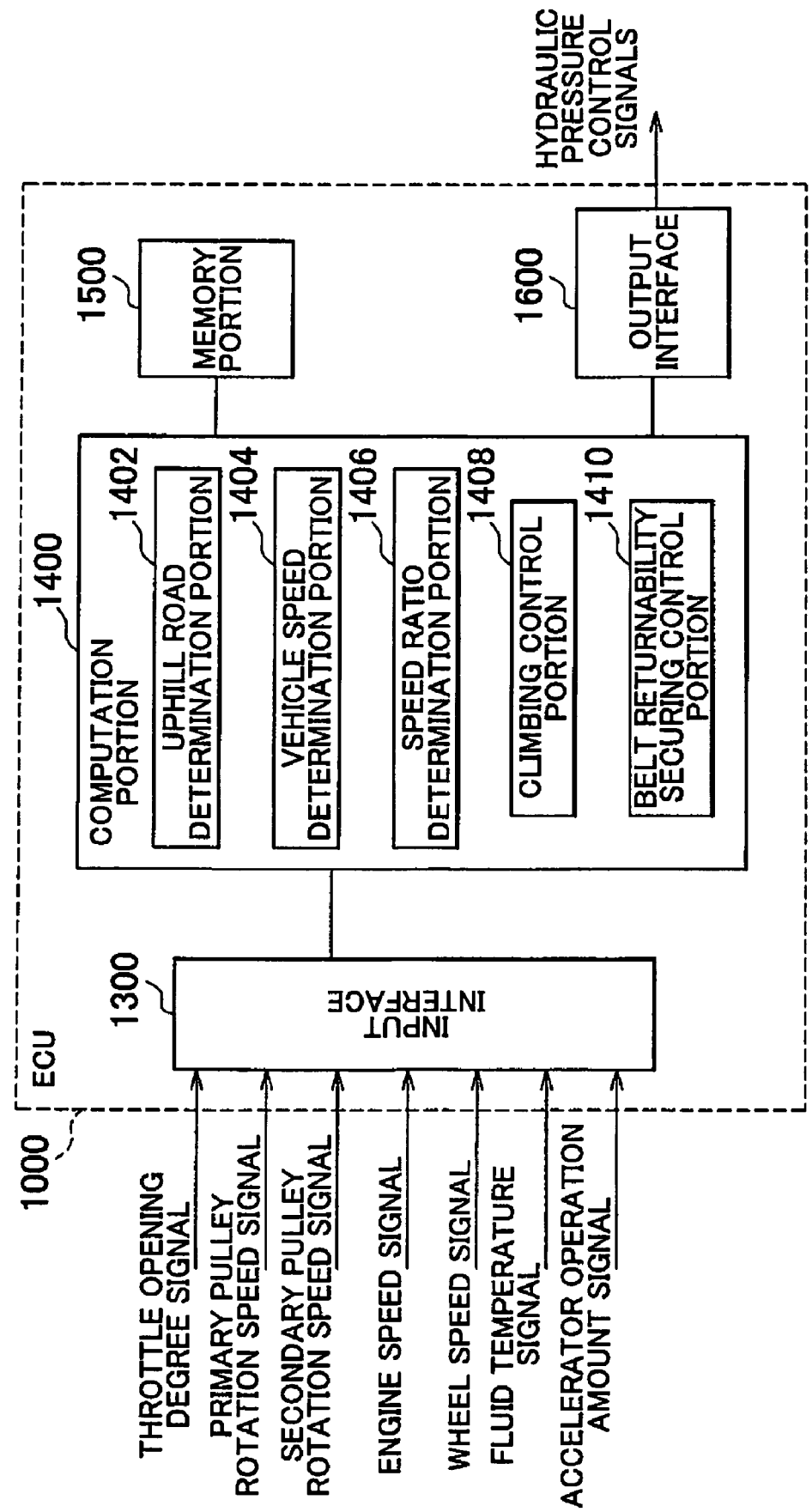
FIG. 2 is a diagram illustrating the function blocks of an ECU constituting the CVT control apparatus of the example embodiment.

FIG. 2 is a diagram illustrating the function blocks of the ECU 1000 that is the CVT control apparatus of this example embodiment. Referring to FIG. 2, the ECU 1000 has an input interface 1300, a computation portion 1400, a memory portion 1500, and an output interface 1600.

The input interface 1300 receives the following signals and send them to the computation portion 1400; the throttle opening signals from the throttle position sensor, the primary pulley rotation speed signals from the primary pulley rotation speed sensor 410, the secondary pulley rotation speed signals from the secondary pulley rotation speed sensor 420, the engine speed signals from the engine speed sensor 430, the wheel speed signals from the wheel speed sensor 440, the hydraulic fluid temperature signals from the fluid temperature sensor 450, and the accelerator operation amount signals from the accelerator operation amount sensor 460.

The computation portion 1400 includes an uphill road determination portion 1402, a vehicle speed determination portion 1404, a speed ratio determination portion 1406, a climbing control portion 1408, and a belt returnability securing control portion 1410.

The uphill road determination portion 1402 determines whether the vehicle is presently traveling on an uphill road based on the wheel speed signals and the throttle opening signals received via the input interface 1300.

More specifically, the uphill road determination portion 1402 performs this determination by comparing the actual acceleration of the vehicle that is calculated based on the wheel speed signals and a reference acceleration that has been stored beforehand in the memory portion 1500 and read out in accordance with the throttle signals and the wheel speed signals.

For example, if the actual acceleration of the vehicle is lower than the reference acceleration, the uphill road determination portion 1402 determines that the vehicle is presently traveling on an uphill road. On the other hand, if the actual acceleration of the vehicle is equal to or higher than the reference acceleration, the uphill road determination portion 1402 determines that the vehicle is not travelling on an uphill road.

Alternatively, a sensor for detecting a physical quantity related to the gradient of the road (e.g., G-sensor) may be provided. In this case, whether the vehicle is presently travelling on an uphill road can be determined based on the physical quantity detected by this sensor. The uphill road determination portion 1402 may be adapted to set an uphill road determination flag to ON when it has been determined that the vehicle is travelling on an uphill road.

The vehicle speed determination portion 1404 determines whether the vehicle speed is higher than a reference vehicle speed Vblt based on the wheel speed signals received via the input interface 1300. The reference vehicle speed Vblt is set to a value at and above which deterioration of the belt returnability is concerned. More specifically, the reference vehicle speed Vblt is set in accordance with the gradient of the road. For example, the larger the gradient of the road, the lower the reference vehicle speed Vblt is made. The characteristic of the reference vehicle speed Vblt may be empirically set.

The vehicle speed determination portion 1404 may perform the above determination as to the vehicle speed on the condition that the uphill road determination flag is ON and may set a climbing control execution flag to ON if the detected vehicle speed is higher than the reference vehicle speed Vblt.

The speed ratio determination portion 1406 determines whether a speed ratio $\gamma(1)$, required to maintain a sufficient climbing performance of the vehicle is higher (more speed-reducing) than a speed ratio $\gamma(2)$ required to maintain a sufficient returnability of the belt 700. Note that the speed ratio determination portion 1406 may be adapted to determine whether the target rotation speed of the primary pulley 500 which is set in the climbing control is higher than the target rotation speed of the primary pulley 500 which is set in the belt returnability securing control.

The speed ratio determination portion 1406 calculates the speed ratio $\gamma(1)$ required to secure a sufficient climbing performance of the vehicle based on the target rotation speed of the primary pulley 500 calculated from the wheel speed signals and the primary pulley rotation speed signals received via the input interface 1300 and a map for setting a climbing control target rotation speed of the primary pulley 500.

Figure 3:
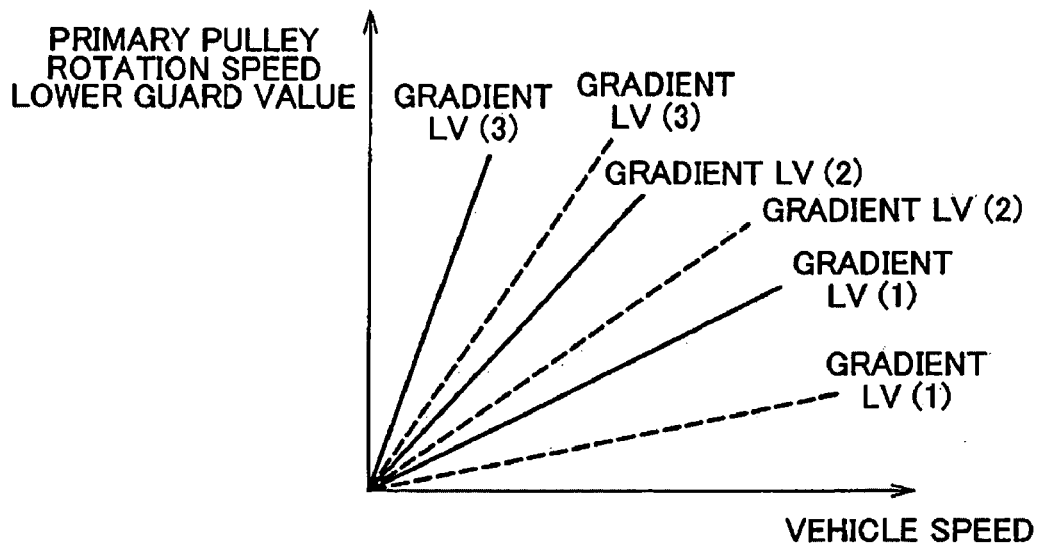
FIG. 3 is a graph illustrating how the rotation speed of the primary pulley changes with respect to the vehicle speed in the climbing control and in the belt returnability securing control.

The broken lines in the graph of FIG. 3 illustrate an example of the map for setting the climbing control target rotation speed of the primary pulley 500. The horizontal axis of the graph of FIG. 3 represents the vehicle speed while the vertical axis represents the primary pulley rotation speed NIN. As indicated by the broken lines, the higher the level of the gradient of the road (as the level of the gradient of the road increases from the gradient level 1 to the gradient level 3), the larger the slope of the line of the climbing control target rotation speed which extends substantially straight with respect to the vehicle speed. Based on this map, the climbing control target rotation speed is set to the lower limit of the rotation speed range in which the acceleration performance of the vehicle is appropriate for the gradient of the road.

While the climbing control target rotation speed is set using the three gradient levels in this example embodiment as mentioned above, the number of the gradient levels is not limited to three.

The speed ratio determination portion 1406 calculates the speed ratio $\gamma(2)$ required to secure a sufficient returnability of the belt 700 using the wheel speed signals, the primary pulley rotation speed signals received via the input interface 1300, and a map for setting the lower guard value of the rotation speed of the primary pulley 500, which is used in the control for securing a sufficient returnability of the belt 700. The lower guard value of the rotation speed of the primary pulley 500 is set to a value from which the speed ratio of the CVT can be properly returned to the highest ratio (the most speed-reducing ratio) when the vehicle is braked.

The solid lines in the graph of FIG. 3 illustrate an example of the map for setting the lower guard value of the primary pulley rotation speed used in the control for securing a sufficient returnability of the belt 700. As indicated by the solid lines in FIG. 3, the higher the level of the gradient of the road, the larger the slope of the line of the lower guard value of the primary pulley rotation speed which extends substantially straight with respect to the vehicle speed. While the lower guard value of the primary pulley rotation speed is set according to the three gradient levels in this example embodiment as mentioned above, the number of the gradient levels is not limited to three.

As shown in FIG. 3, at each gradient level and each vehicle speed, the climbing control target rotation speed is lower than the lower guard value for securing a sufficient returnability of the belt 700.

It is to be noted that when the gradient of the road is of a value corresponding to none of the gradient levels shown in FIG. 3, the lower guard value and the climbing control target rotation speed may be calculated through linear interpolation of the values corresponding to the gradient levels shown in FIG. 3, or the like. Further, it is to be noted that the relation between the lower guard value for securing a sufficient returnability of the belt 700 and the vehicle speed and the relation between the climbing control target rotation speed and the vehicle speed are not necessarily linear.

For example, when the climbing control execution flag is OFF, the speed ratio determination portion 1406 compares the speed ratio γ(1) and the speed ratio γ(2), and if the speed ratio γ(1) is higher than the speed ratio γ(2), the speed ratio determination portion 1406 sets the climbing control execution flag to ON, and if the speed ratio γ(1) is equal to or lower than the speed ratio γ(2), on the other hand, the speed ratio determination portion 1406 sets a belt returnability securing control execution flag to ON.

The climbing control portion 1408 controls the CVT such that the actual rotation speed of the primary pulley 500 equals the target rotation speed. More specifically, at this time, the climbing control portion 1408 generates given hydraulic pressure control signals for controlling the clamping pressure applied to the belt 700 at the primary pulley 500 and the clamping pressure applied to the belt 700 at the secondary pulley 600 and outputs the generated hydraulic pressure control signals to the corresponding solenoids via the output interface 1600.

During the climbing control (i.e., as long as the climbing control execution flag is ON), the climbing control portion 1408 sets the target rotation speed of the primary pulley 500 using the lower guard value, which is set during the climbing control, as the minimum value. Until the target rotation speed of the primary pulley 500 exceeds the climbing control target rotation speed, the climbing control portion 1408 controls the lower guard value such that it increases as the target rotation speed of the primary pulley 500 increases, but it does not decrease even if the target rotation speed of the primary pulley 500 decreases. Note that lower guard Value is not increased beyond the climbing control target rotation speed. The climbing control portion 1408 sets the target rotation speed of the primary pulley 500 equal to or higher than the climbing control target rotation speed.

Figure 4:
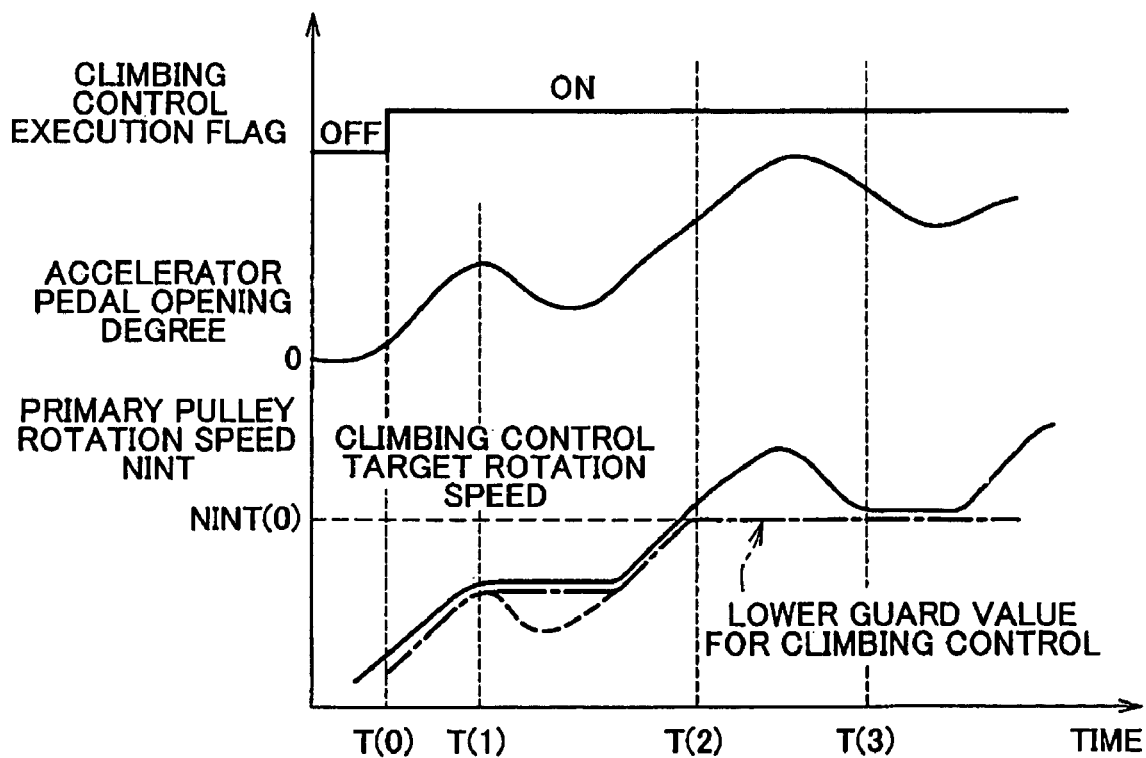
FIG. 4 is a timing chart illustrating how the operation amount of the accelerator pedal and the target rotation speed of the primary pulley change in the climbing control.

Such variation of the target rotation speed of the primary pulley 500 during the climbing control will be described below with reference to FIG. 4. The chart of FIG. 4 illustrates an example case where the operation amount of the accelerator pedal increases from zero in response to the accelerator pedal being stepped down by the driver. Referring to FIG. 4, a condition for executing the climbing control is satisfied at time t(0). This condition is satisfied, for example, when the actual acceleration of the vehicle that is calculated based on the wheel speed detected by the wheel speed sensor 440 is lower than a reference acceleration that is determined based on the opening degree of the throttle and the rotation speed of the primary pulley 500. At time t(0), thus, the ECU 1000 sets the climbing control execution flag to ON. At this time, the ECU 1000 calculates a climbing control target rotation speed NINT(0) using a corresponding map. Note that in this example case it is assumed that the gradient of the road on which the vehicle is travelling is constant.

Then, the operation amount of the accelerator pedal increases until time t(1) as the driver further steps the accelerator pedal down. During this, the target rotation speed of the primary pulley 500 increases, and therefore the engine 100 increases the lower guard value accordingly. As such, the target rotation speed of the primary pulley 500 does not decrease even if the operation amount of the accelerator pedal decreases within the time period from time t(1) to time t(2). That is, during this time period, the CVT is not shifted up.

Then, the target rotation speed of the primary pulley 500, which is set based on the operation amount of the accelerator pedal and the vehicle speed, exceeds the climbing control target rotation speed NINT(0) at time T(2). At this time, however, the engine 100 does not increase the lower guard value beyond the climbing control target rotation speed NINT(0). Therefore, the target rotation speed of the primary pulley 500 does not decrease below the climbing control target rotation speed NINT(0) when the operation amount of the accelerator pedal drops at time T(3).

The climbing control portion 1408 performs feedback control to hydraulic actuators so as to reduce the difference between the actual rotation speed of the primary pulley 500 detected by the primary pulley rotation speed sensor 410 and the present target rotation speed of the primary pulley 500.

Further, the climbing control portion 1408 performs sweep control in addition to the foregoing feedback control to the actual rotation speed of the primary pulley 500. That is, in the sweep control, the climbing control portion 1408 controls the hydraulic actuators such that the rate of change in the actual rotation speed of the primary pulley 500 does not exceed a reference rate that is set as an upper guard value in accordance with the gradient level of the road on which the vehicle is traveling. Note that this sweep control may alternatively be performed such that the rate of change in the target rotation speed of the primary pulley 500 does not exceed an upper guard value. Further, the upper guard value may be a predetermined value. The characteristic of the reference rate, which is set in accordance with the gradient level of the road as mentioned above, may be empirically determined in advance.

The belt returnability securing control portion 1410 controls the CVT such that the rotation speed of the primary pulley 500 equals the target rotation speed and the rotation speed of the primary pulley 500 detected by the primary pulley rotation speed sensor 410 does not become lower than the lower guard value. The belt returnability securing control portion 1410 generates given hydraulic pressure control signals for controlling the clamping pressure applied to the belt 700 at the primary pulley 500 and the clamping pressure applied to the belt 700 at the secondary pulley 600 and outputs the generated hydraulic pressure control signals to the hydraulic actuators via the output interface 1600.

During the belt returnability securing control (i.e., as long as the belt returnability securing control execution flag is ON), the belt returnability securing control portion 1410 sets the target rotation speed of the primary pulley 500 based on the operation amount of the accelerator pedal and the vehicle speed and using the lower guard value set based on the gradient level of the road as the minimum value. At this time, the lower guard value has a substantially linear relation with the vehicle speed.

Figure 5:
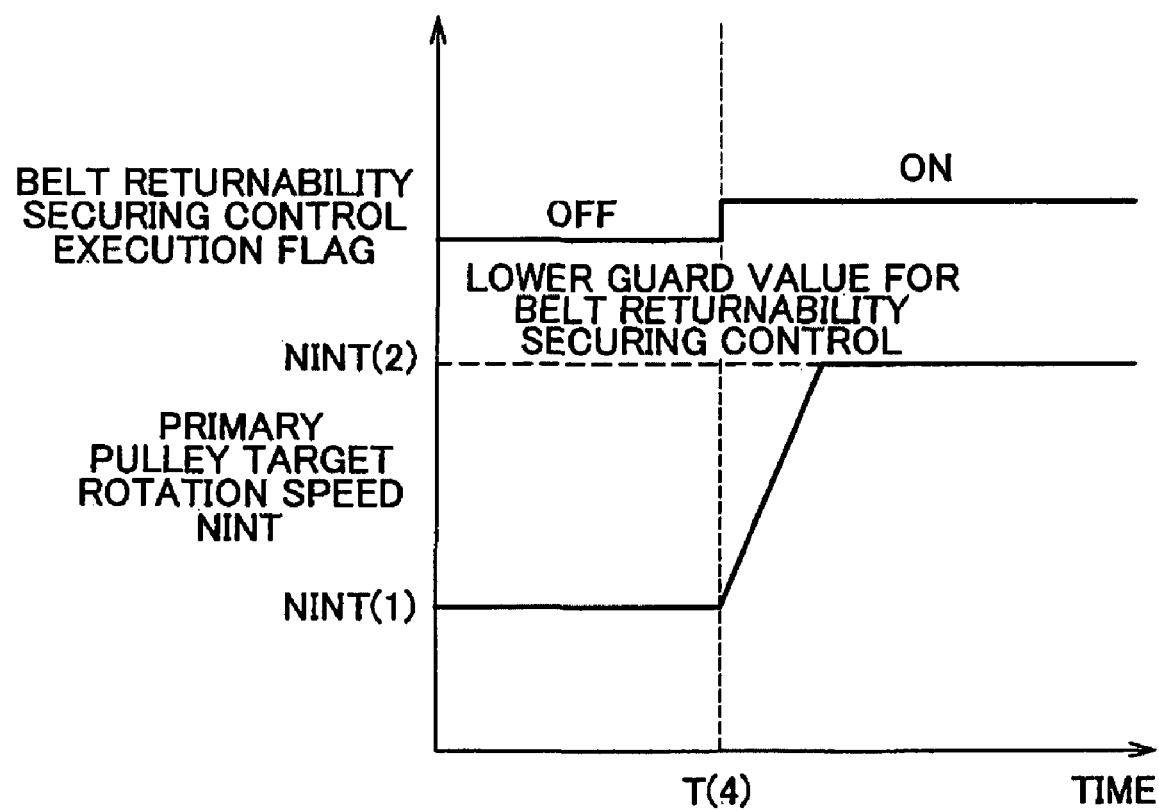
FIG. 5 is a timing chart illustrating how the target rotation speed of the primary pulley changes in the belt returnability securing control.

In the following, such variation of the target rotation speed of the primary pulley 500 during the belt returnability securing control will be described with reference to FIG. 5. FIG. 5 illustrates an example case where the belt returnability securing control execution flag is OFF and the climbing control target rotation speed NINT(1) is set in accordance with the operation amount of the accelerator pedal and the vehicle speed.

Referring to FIG. 5, a belt returnability securing control execution condition is satisfied at time T(4), after which the target rotation speed of the primary pulley 500 is forcibly increased from the climbing control target rotation speed NINT(1) up to a lower guard value NINT(2) that is set in accordance with the gradient level of the road. At this time, the target rotation speed of the primary pulley 500 may either be increased in steps from NINT(1) to NINT(2), at a predetermined rate as in the example case of FIG. 5, or at a rate that is set according to the running state of the vehicle (gradient level, vehicle speed, etc.).

The belt returnability securing control portion 1410 performs feed-back control to the hydraulic actuators so as to reduce the difference between the actual rotation speed of the primary pulley 500 detected by the primary pulley rotation speed sensor 410 and the present target rotation speed of the primary pulley 500.

In the case where the target rotation speed of the primary pulley 500 is increased in steps as described above, the belt returnability securing control portion 1410 may perform sweep control in addition to the feedback control to the actual rotation speed of the primary pulley 500.

In this sweep control, more specifically, the belt returnability securing control portion 1410 controls the hydraulic actuators such that the rate of change in the actual rotation speed of the primary pulley 500 does not exceed a reference rate that is set as an upper guard value in accordance with the gradient level of the road on which the vehicle is traveling. Note that the upper guard value may be a predetermined value.

According to the sweep control described above, even in the case where the target rotation speed of the primary pulley 500 is changed in steps upon transition from the climbing control to the belt returnability securing control, the actual rotation speed of the primary pulley 500 does not change sharply.

While the CPU (Central Processing Unit), which constitutes the computation portion 1400, serves as the uphill-road determination portion 1402, the vehicle speed determination portion 1404, the speed ratio determination portion 1406, the climbing control portion 1408, and the belt returnability securing control portion 1410 by executing corresponding programs stored in the memory portion 1500 in this example embodiment, these portions may be provided as separate hardware elements. Note that the programs for these portions are stored in a recording medium provided in the vehicle.

The memory portion 1500 stores various information, programs, thresholds, maps, and so on. The computation portion 1400 extracts various data from and inputs various data to the memory portion 1500 as needed.

In the following, the algorithm of the program executed by the ECU 1000, which is the CVT control apparatus of this example embodiment, will be described with reference to FIG. 6.

Figure 6:
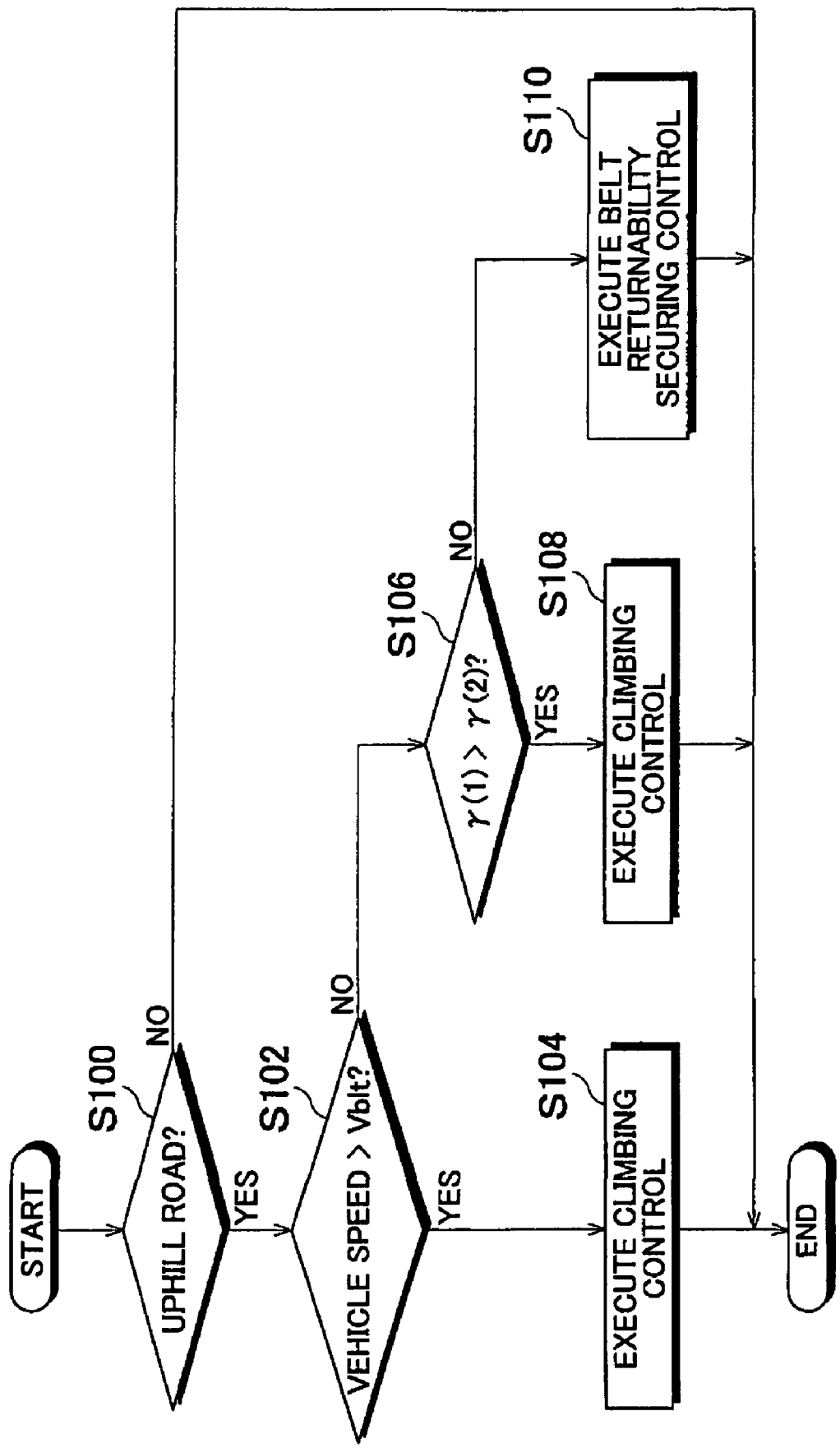
FIG. 6 is a flowchart illustrating the algorithm of a program executed by the ECU constituting the CVT control apparatus of the example embodiment.

Referring to FIG. 6, in step 100, the ECU 1000 determines whether the vehicle is now traveling on an uphill road. If so (step 100: YES), the ECU 1000 proceeds to step 102. If not (step 100: NO), the ECU 1000 finishes the present cycle of the control routine.

In step 102, the ECU 1000 determines whether the vehicle speed detected by the wheel speed sensor 440 is higher than the reference vehicle speed Vblt that is set in accordance with the gradient level of the road. If so (step 102: YES), the ECU 1000 proceeds to step 104. In not, the ECU 1000 proceeds to step 106.

In step 104, the ECU 1000 executes the climbing control. On the other hand, in step 106, the ECU 1000 determines whether the speed ratio γ(1) required to secure a sufficient climbing performance of the vehicle is higher than the speed ratio γ(2) required to secure a sufficient returnability of the belt 700, or determines whether the climbing control target rotation speed that is set when the climbing control is to be executed is higher than the lower guard value that is set based on the gradient level of the road and the speed of the vehicle when the belt returnability securing control is to be executed. If the speed ratio γ(1) is higher than the speed ratio γ(2) (step 106: YES), the ECU 1000 proceeds to step 108. If not (step 106: NO), the ECU 1000 proceeds to step 110.

In step 108, the ECU 1000 executes the climbing control. On the other hand, in step 110, the ECU 1000 executes the belt returnability securing control.

In the following, a description will be made of, with reference to FIG. 7, FIG. 8, and FIG. 9, how the ECU 1000, which is the CVT control apparatus of the example embodiment, operates on the above-described control routine.

For example, assuming that the reference vehicle speed Vblt for the gradient level (1) is V(1), the climbing control is executed (step 104) if it is determined that the vehicle is presently traveling on an uphill road of the gradient level (1) (step 100: YES) at a speed equal to or higher than V(1) (step 102: YES). At this time, if the target rotation speed of the primary pulley 500 corresponding to the present operation amount of the accelerator pedal and the present vehicle speed is higher than the climbing control target rotation speed for the gradient level (1), the actual rotation speed of the primary pulley 500 is controlled using the climbing control target rotation speed for the gradient level (1) as the lower guard value.

Figure 7:
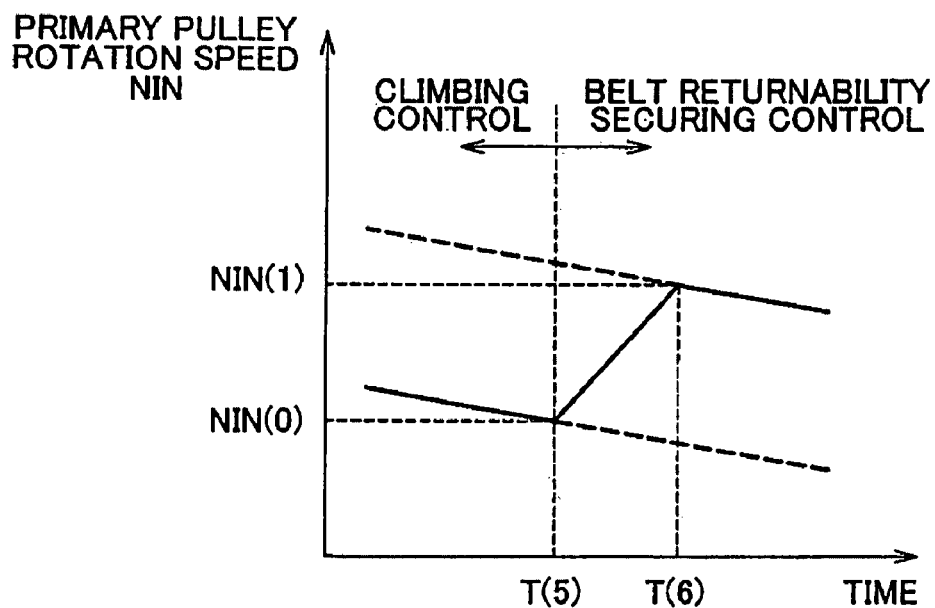
FIG. 7 is a timing chart illustrating how the actual rotation speed of the primary pulley changes when the shift control is being switched from the climbing control to the belt returnability securing control.

As shown in FIG. 7, when the drive power produced in the vehicle starts to decrease in response to, for example, the driver releasing the accelerator pedal, the vehicle speed starts to decrease and so does the actual rotation speed of the primary pulley 500.

The actual rotation speed of the primary pulley 500 decreases to NIN(0) at time T(5). At this time, if the vehicle speed is equal to or lower than V(1) (step 102: NO) and the speed ratio γ(1) required to secure a sufficient climbing performance of the vehicle is equal to or lower than the speed ratio γ(2) required to secure a sufficient returnability of the belt 700 (step 106: NO), the target rotation speed of the primary pulley 500 is forcibly increased from the actual primary pulley rotation speed NIN(0) up to the lower guard value NIN(1) for the gradient level (1) in the belt returnability securing control. At this time, sweep control is executed, so that the actual rotation speed of the primary pulley 500 increases at a rate corresponding to the gradient level (1), and at time T(6), the actual rotation speed of the primary pulley 500 reaches the lower guard value NIN(1) that corresponds to the vehicle speed at this time. After time T(6), the speed ratio of the CVT is controlled, as the vehicle speed decreases, so as to secure a sufficient returnability of the belt 700.

Figure 8:
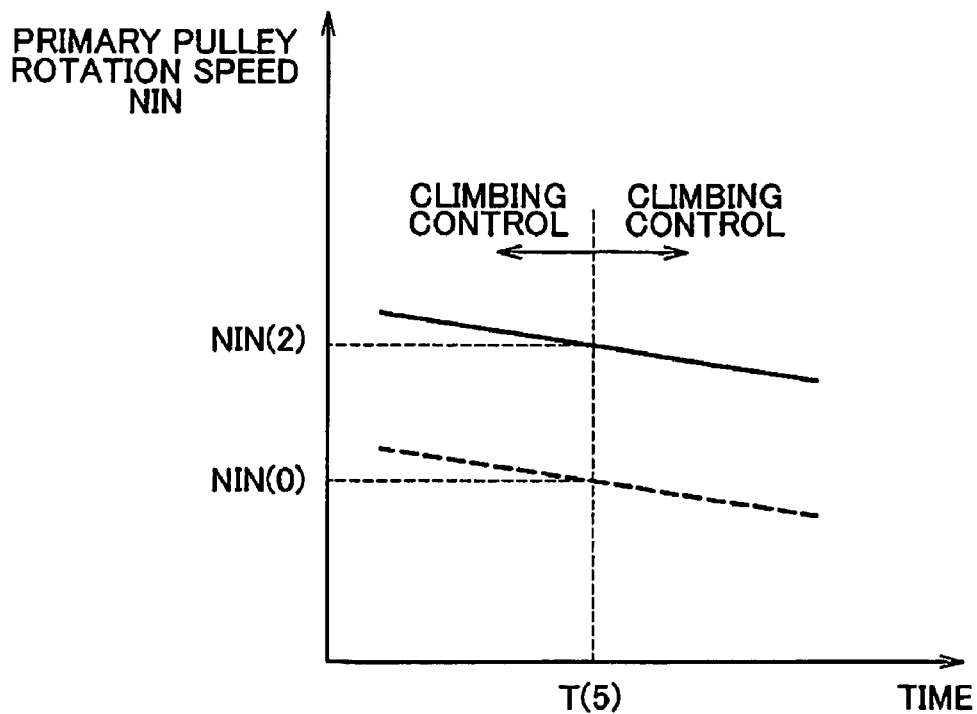
FIG. 8 is another timing chart illustrating how the actual rotation speed of the primary pulley changes when the shift control is being switched from the climbing control to the belt returnability securing control.

Further, as shown in FIG. 8, the actual rotation speed of the primary pulley 500 decreases to NIN(2) at time t(5). At this time, if the vehicle speed is equal to or lower than V(1) (step 102: NO) and the speed ratio γ(1) required to secure a sufficient climbing control is higher than the speed ratio γ(2) required to secure a sufficient returnability of the belt 700 (step 106: YES), the climbing control is continued (step 108). In this case, therefore, the target rotation speed of the primary pulley 500 is not changed in steps.

Further, as the vehicle speed decreases, the shift control mode is switched from the climbing control to the belt returnability securing control. At this time, the reference vehicle speed Vblt is set in accordance with the gradient level of the road.

Figure 9:
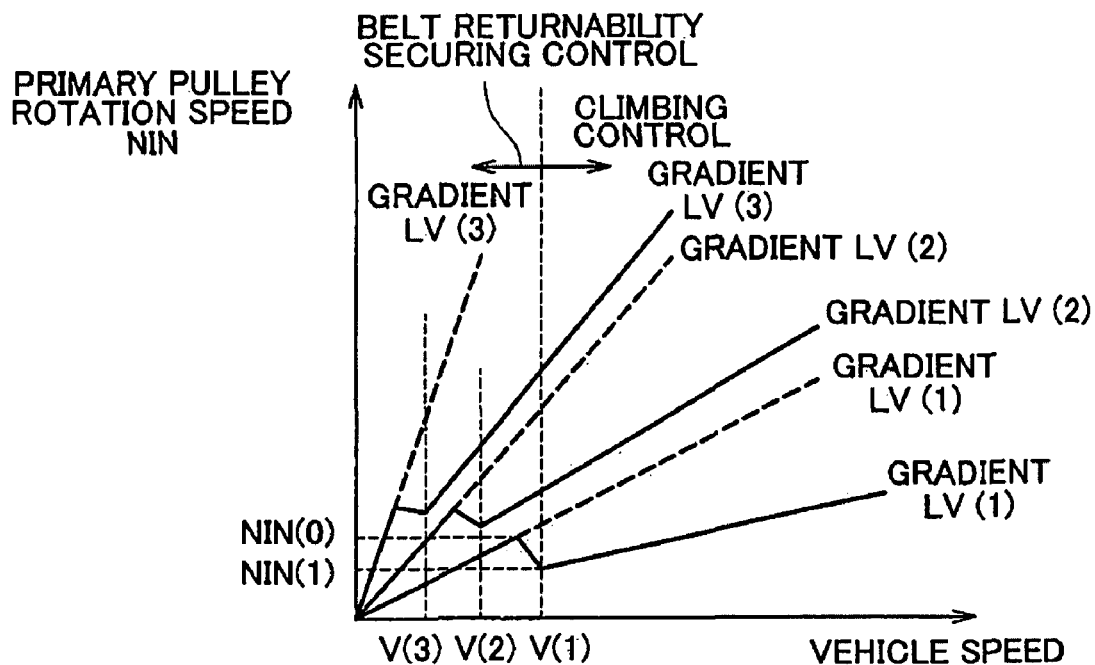
FIG. 9 is a graph illustrating how the rotation speed of the primary pulley changes with respect to the vehicle speed at each gradient level.

For example, as shown in FIG. 9, the reference vehicle speed Vblt is set to V(1) when the gradient of the road corresponds to the gradient level (1), and the reference vehicle speed Vblt is set to V(2), which is smaller than V(1), when the gradient of the road corresponds to the gradient level (2), which is larger than the gradient level (1), and the reference vehicle speed Vblt is set to V(3), which is smaller than V(2), when the gradient of the road corresponds to the gradient level (3), which is larger than the gradient level (2).

With the reference vehicle speed Vblt thus set, when the gradient of the road on which the vehicle is traveling corresponds to the gradient level (1), for example, the climbing control is continued until the vehicle speed becomes equal to or lower than V(1). During this time, therefore, the target rotation speed of the primary pulley 500 is reduced substantially linearly with respect to the vehicle speed along with the line of the lower guard value for the gradient level (1) that is set in the climbing control.

As the vehicle speed becomes equal to or lower than V(1), the lower guard value that is set for the gradient level (1) in the belt returnability securing control becomes larger than the lower guard value that is set for the gradient level (1) in the climbing control, so that the belt returnability securing control is started. At this time, the actual rotation speed of the primary pulley 500 is increased up to the lower guard value that is set for the gradient level (1) in the belt returnability securing control (the value indicated by the broken line in FIG. 9). At this time, the actual rotation speed of the primary pulley 500 is changed at a rate set for the gradient level (1). Thus, the actual rotation speed of the primary pulley 500 does not change shapely, and therefore the driver does not feel uncomfortable.

The lower guard value for the climbing control is larger at the gradient level (2) than at the gradient level (1). Therefore, when the vehicle is traveling on an uphill road of a gradient corresponding to the gradient level (2), the climbing control is continued until the vehicle speed becomes equal to or lower than V(2). During this time, therefore as the vehicle speed decreases, the target rotation speed of the primary pulley 500 is reduced substantially linearly with respect to the vehicle speed along with the line of the lower guard value for the gradient level (2).

As the vehicle speed becomes equal to or lower than V(2), the lower guard value that is set for the gradient level (2) in the belt returnability securing control becomes larger than the lower guard value that is set for the gradient level (2) in the climbing control, so that the belt returnability securing control is started. At this time, the actual rotation speed of the primary pulley 500 is increased up to the lower guard value that is set for the gradient level (2) in the belt returnability securing control (the value indicated by the broken line in FIG. 9). At this time, the actual rotation speed of the primary pulley 500 is changed at a rate set for the gradient level (2).

When the vehicle is running on an uphill road of a gradient corresponding to the gradient level (3), the actual rotation speed of the primary pulley 500 is changed with respect to the vehicle speed in the same manner as when the vehicle is running on an uphill road of a gradient corresponding to the gradient level (1) or to the gradient level (2). Therefore, it is not described in detail again.

According to the CVT control apparatus of the example embodiment, as described above, when the vehicle speed is equal to or lower than Vblt and the speed ratio required to secure a sufficient climbing performance of the vehicle is equal to or lower than the speed ratio required to secure a sufficient returnability of the belt 700, the ECU determines that the degree of influence on the returnability of the belt 700 is high. In this case, therefore, the ECU executes the belt returnability securing control to ensure that the belt 700 can be returned to the position corresponding to the initial speed ratio for starting the vehicle from a standstill when the vehicle is being stopped, and this prevents deterioration of the acceleration performance of the vehicle which may otherwise occur when the vehicle is started from a standstill next time.

On the other hand, if the vehicle speed is not equal to nor lower than Vblt and/or if the speed ratio required to secure a sufficient climbing performance of the vehicle is not equal to nor lower than the speed ratio required to secure a sufficient returnability of the belt 700, the ECU determines that the degree of influence on the returnability of the belt 700 is low. In this case, therefore the ECU executes the climbing control in which the drive force produced in the vehicle is controlled to a value appropriate for the vehicle speed and the running resistance of the road. As such, the driver can drive the vehicle just as he or she intends.

As such, the invention provides CVT control apparatuses and CVT control methods that properly switch the shift control mode between the mode for securing a sufficient climbing performance of the vehicle and the mode for securing a sufficient returnability of the belt.

The lower the operation response of the CVT, the lower the returnability of the belt 700 tends to be. Therefore, it is desirable to correct the reference vehicle speed Vblt, the speed ratio for securing a sufficient climbing performance, and the speed ratio for securing a sufficient returnability of the belt based on a physical quantity related to the operation response of the CVT.

The physical quantity related to the operation response of the CVT includes, for example, the temperature of the hydraulic fluid circulated in the CVT. The lower the temperature of the hydraulic fluid, the higher the viscosity of the hydraulic fluid, and conversely, the higher the temperature of the hydraulic fluid, the higher the shift response of the CVT.

Figure 10:
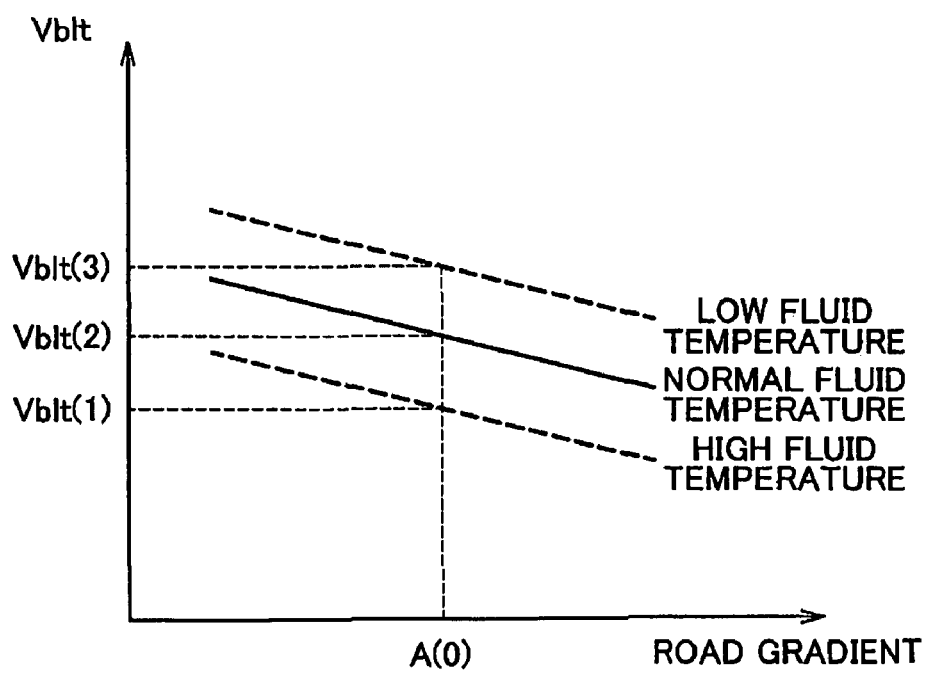
FIG. 10 is a graph illustrating the relation between the reference vehicle speed Vblt and the gradient of the road at each hydraulic fluid temperature.

Therefore, if the reference vehicle speed Vblt, the speed ratio for securing a sufficient climbing performance of the vehicle, and the speed ratio for securing a sufficient returnability of the belt 700 are corrected based on the temperature of the hydraulic fluid circulated in the CVT, the shift control mode can be more properly switched between the mode for securing a sufficient returnability of the belt and the mode for securing a sufficient climbing performance of the vehicle in accordance with the shift response of the CVT. For example, the reference vehicle speed Vblt may be set as illustrated in the graph of FIG. 10 where the vertical axis represents the reference vehicle speed Vblt and the horizontal axis represents the gradient of the road. Referring to FIG. 10, the higher the gradient of the road, the lower the reference vehicle speed Vblt is made substantially linearly. Assuming that the gradient of the road is constant, when the temperature of the hydraulic fluid of the CVT is low (e.g., when it is lower than a predetermined temperature range), the reference vehicle speed Vblt is set higher than it is when the temperature is normal (e.g., when it is in the predetermined temperature range), and when the temperature of the hydraulic fluid of the CVT is high (e.g., when it is higher than the predetermined temperature range), the reference vehicle speed Vblt is set lower than it is when the temperature is normal (e.g., when it is in the predetermined temperature range).

That is, assuming that the gradient of the road is A(0), if the temperature of the hydraulic fluid is normal, the reference vehicle speed Vblt is set to Vblt(2), and if the temperature of the hydraulic fluid is low, the reference vehicle speed Vblt is set to Vblt(3) that is higher than Vblt(2), and if the temperature of the hydraulic fluid is high, the reference vehicle speed Vblt is set to Vblt(1) that is lower than Vblt(2). In this manner, the shift control mode is appropriately switched between the mode for securing a sufficient returnability of the belt and the mode for securing a sufficient climbing performance of the vehicle in accordance with the shift response of the CVT.

Further, the larger the gradient of the road, the shorter the stopping distance of the vehicle when it is stopped, and thus the degree of influence on the returnability of the belt increases accordingly. To counter this, preferably, the reference vehicle speed Vblt, the speed ratio for securing a sufficient climbing performance of the vehicle, and the speed ratio for securing a sufficient returnability of the belt are corrected in accordance with the gradient of the road. In this case, the shift control mode can be appropriately switched between the mode for securing a sufficient returnability of the belt and the mode for securing a sufficient climbing performance of the vehicle in accordance with the running state of the vehicle.

While the invention has been described with reference to the example embodiment thereof, it is to be understood that the invention is not limited to the example embodiment and construction. To the contrary, the invention is intended to cover various modifications and equivalent arrangements. In addition, while the various elements of the example embodiment are shown in various combinations and configurations, which are exemplary, other combinations and configurations, including more, less or only a single element, are also within the sprit and scope of the invention.

What is claimed is:

1. A control apparatus for a continuously variable transmission provided in a vehicle, the continuously variable transmission having a drive pulley the width of a groove of which is varied using an actuator, a driven pulley the width of a groove of which is varied using an actuator, and a belt wound around the drive pulley and the driven pulley, the diameter of the belt loop at the drive pulley and the diameter of the belt loop at the driven pulley being variable to change the speed ratio of the continuously variable transmission, the control apparatus comprising:

a speed detection portion that detects a physical quantity corresponding to a speed of the vehicle;

a determination portion that determines whether predetermined conditions that have an influence on the returnability of the belt of the continuously variable transmission are satisfied, based on a state of the vehicle; and a control portion that, when the vehicle is traveling on an uphill road, executes a first shift control mode for controlling the continuously variable transmission so that the speed ratio of the continuously variable transmission is brought to a speed ratio that secures a sufficient climbing performance of the vehicle if it is determined that predetermined conditions are not satisfied and executes a second shift control mode for controlling the continuously variable transmission so that the speed ratio of the continuously variable transmission is brought to a speed ratio that secures a sufficient returnability of the belt if it is determined that the predetermined conditions are satisfied, wherein the predetermined conditions are that the detected speed is equal to or lower than a reference vehicle speed that is set in accordance with the gradient of the uphill road and that a first target speed ratio that is set in accordance with the state of the vehicle when the first shift control mode is selected is equal to or lower than a second target speed ratio that is set in accordance with the state of the vehicle when the second shift control mode is selected.

2. The control apparatus according to claim 1, further comprising:

a response detection portion that detects the temperature of hydraulic fluid circulated in the continuously variable transmission, the temperature of the hydraulic fluid being related to the operation response of the continuously variable transmission; and a first correction portion that corrects the reference vehicle speed, the first target speed ratio, and the second target speed ratio in accordance with the detected temperature of the hydraulic fluid.

3. The control apparatus according to claim 1, further comprising:

a gradient detection portion that detects a physical quantity related to the gradient of a road on which the vehicle is traveling, a second correction portion that corrects the reference vehicle speed, the first target speed ratio, and the second target speed ratio in accordance with the detected physical quantity.

4. The control apparatus according to claim 1, further comprising:

a requirement degree determination portion that determines the degree of requirement for producing drive force for the vehicle; and a rotation speed detection portion that detects the rotation speed of the drive pulley, a speed ratio determination portion that sets the first target speed ratio and the second target speed ratio based on the detected requirement degree, the detected rotation speed, and the detected speed.

5. The control apparatus according to claim 1, wherein:

the control portion includes a speed ratio determination portion sets the higher of the first target speed ratio and the second target speed ratio to an actual target speed ratio of the continuously variable transmission; and a speed ratio control portion controls the speed ratio of the continuously variable transmission to the actual target speed ratio.

6. The control apparatus according to claim 5, wherein the speed ratio control portion includes a sub portion that controls the speed ratio of the continuously variable transmission such that, when the set actual target speed ratio of the continuously variable transmission is being switched from one of the first target speed ratio and the second target speed ratio to the other, the rate of change in the speed ratio does not exceed a rate that is set in accordance with the gradient of the uphill road.

7. A method for controlling a continuously variable transmission provided in a vehicle, the continuously variable transmission having a drive pulley the width of a groove of which is varied using an actuator, a driven pulley the width of a groove of which is varied using an actuator, and a belt wound around the drive pulley and the driven pulley, the diameter of the belt loop at the drive pulley and the diameter of the belt loop at the driven pulley being variable to change the speed ratio of the continuously variable transmission, the method comprising:

detecting a physical quantity corresponding to a speed of the vehicle;

determining whether predetermined conditions that have an influence on the returnability of the belt of the continuously variable transmission are satisfied, based on a state of the vehicle; and when the vehicle is traveling on an uphill road, executing a first shift control mode for controlling the continuously variable transmission so that the speed ratio of the continuously variable transmission is brought to a speed ration that secures a sufficient climbing performance of the vehicle if it is determined that the predetermined conditions are not satisfied, and executing a second shift control mode for controlling the continuously variable transmission so that the speed ratio of the continuously variable transmission is brought to a speed ratio that secures a sufficient returnability of the belt if it is determined that the predetermined conditions are satisfied, wherein the predetermined conditions are that the detected speed is equal to or lower than a reference vehicle speed that is set in accordance with the gradient of the uphill road and that a first target speed ratio that is set in accordance with the state of the vehicle when the first shift control mode is selected is equal to or lower than a second target speed ratio that is set in accordance with the state of the vehicle when the second shift control mode is selected.

8. The method according to claim 7, further comprising:

detecting the temperature of hydraulic fluid circulated in the continuously variable transmission, the temperature of the hydraulic fluid being related to the operation response of the continuously variable transmission; and correcting the reference vehicle speed, the first target speed ratio, and the second target speed ratio in accordance with the detected temperature of the hydraulic fluid.

9. The method according to claim 7, further comprising:

detecting a physical quantity related to the gradient of a road on which the vehicle is traveling; and correcting the reference vehicle speed, the first target speed ratio, and the second target speed ratio in accordance with the detected physical quantity.

10. The method according to claim 7, further comprising:

determining the degree of requirement for producing drive force for the vehicle;

detecting the rotation speed of the drive pulley; and setting the first target speed ratio and the second target speed ratio based on the detected requirement degree, the detected rotation speed, and the detected speed.

11. The method according to claim 7, further comprising:

setting the higher of the first target speed ratio and the second target speed ratio to an actual target speed ratio of the continuously variable transmission; and controlling the speed ratio of the continuously variable transmission to the set actual target speed ratio.

12. The method according to claim 11, wherein:

the controlling the speed ratio of the continuously variable transmission includes controlling the speed ratio of the continuously variable transmission such that, when the set actual target speed ratio of the continuously variable transmission is being switched from one of the first target speed ratio and the second target speed ratio to the other, the rate of change in the speed ratio does not exceed a rate that is set in accordance with the gradient of the uphill road.

* * * * *